(12) United States Patent
Gulick (10) Patent No.: US 7,120,720 B1
(45) Date of Patent: Oct. 10, 2006

(54) MICROCOMPUTER BRIDGE FOR REMOTE MANAGEABILITY

(75) Inventor: Dale E Gulick, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 483 days.

(21) Appl. No.: 10/045,117

(22) Filed: Nov. 1, 2001

(51) Int. Cl.
G06F 13/14 (2006.01)
(52) U.S. Cl. ........................... 710/305; 340/3.1
(58) Field of Classification Search ........ 709/208–210; 714/14; 340/870.09, 870.39, 545.5, 3.1, 340/3.43; 710/305, 306, 309, 311, 313
See application file for complete search history.

(56) References Cited

U.S. PATENT DOCUMENTS

| | | | | |
|---|---|---|---|---|
| 4,910,732 A | * | 3/1990 | Schwarz | 370/447 |
| 5,925,135 A | * | 7/1999 | Trieu et al. | 713/400 |
| 6,282,642 B1 | * | 8/2001 | Cromer et al. | 713/2 |
| 6,360,327 B1 | * | 3/2002 | Hobson | 713/300 |
| 6,408,334 B1 | * | 6/2002 | Bassman et al. | 709/223 |
| 6,415,324 B1 | * | 7/2002 | Cromer et al. | 709/229 |
| 6,477,602 B1 | * | 11/2002 | Loison | 710/301 |
| 6,732,280 B1 | * | 5/2004 | Cheok et al. | 713/300 |
| 2002/0069353 A1 | * | 6/2002 | Smith | 713/1 |
| 2002/0188875 A1 | * | 12/2002 | Hwang et al. | 713/300 |
| 2002/0194415 A1 | * | 12/2002 | Lindsay et al. | 710/305 |
| 2003/0014517 A1 | * | 1/2003 | Lindsay et al. | 709/224 |
| 2003/0028633 A1 | * | 2/2003 | Lindsay et al. | 709/224 |

OTHER PUBLICATIONS

Barth F., AMD-90001 Zorak IO Hub Data Sheet 0.4, Oct. 1, 2000.*
Intel, "Low Pin Count (LPC) Interface Specification Revision 1.0," pp. 1-31 (Sep. 29, 1997).
Standard Microsystems Corporation, "100 Pin Enhanced Super I/O for LPC Bus with SMBus Controller for Commercial Application," Part No. LPC47B37x, pp. 1-254 (Jun. 17, 1999).
Intel, "Communication and Networking Riser Specification," Revision 1.0 (Feb. 7, 2000).
FIPS Pub 140-1 Federal Information Processing Standards Publication, "Security Requirements for Cryptographic Modules" (Jan. 11, 1994).
"Handbook of Applied Cryptography" CRC Press 1997 pp. 154-157, 160-161, 191-198, 203-212.
DMTF, "Alert Standard Format (ASF) Specification" DSP0114, Version 1.03, Jun. 20, 2001.
Intel, "Advanced Configuration and Power Interface Specification," Revision 1.0b, Feb. 2, 1999.
Intel, "Advanced Configuration and Power Interface Specification," Revision 2.0, Jul. 27, 2000.

(Continued)

Primary Examiner—Rehana Perveen
Assistant Examiner—Clifford Knoll
(74) Attorney, Agent, or Firm—Williams, Morgan & Amerson (57) ABSTRACT

An integrated circuit with an Alert Standard Format management engine for ASF functionality. The integrated circuit includes a first bus interface logic for coupling to a first external bus, an Alert Standard Format management engine configured to receive ASF sensor data over the first external bus, and an indicator configured to indicate a master mode or a slave mode for the Alert Standard Format management engine. In the master mode, the Alert Standard Format management engine is further configured to actively poll for the ASF sensor data over the first external bus. In the slave mode, the Alert Standard Format management engine is not further configured to actively poll for the ASF sensor data over the first external bus.

29 Claims, 10 Drawing Sheets

OTHER PUBLICATIONS

Intel, "Advanced Configuration and Power Interface Specification," Revision 2.0, Errata, Errata Document Rev. 1.5, Apr. 13, 2001.

Case, Fedor, Schoffstall, Davin, "A Simple Network Management Protocol (SNMP)" May 1990.

"Network Device Class Power Management Reference Specification," Version 210, Oct. 12, 2000 pp. 1-9.

Intel, "IPMI Intelligent Platform Management Interface Specification v 1.0," Document Revision 1.0, Sep. 16, 1998.

Intel, "IPMI Intelligent Platform Management Interface Specification v 1.5," Document Revision 1.0, Feb. 21, 2001.

Intel, "IPMI v 1.5 Addenda, Errata, and Clarifications—Intelligent Platform Management Interface Specification v1.5, revision 1.0," Addendum Document Revision 3, May 16, 2001.

Intel, "IPMI Platform Management FRU Information Storage Definition v1.0," Document Revision 1.0, Sep. 16, 1998.

Socolofsky et al., "A TCP/IP Tutorial," Jan. 1991.

Intel, "IPMI Platform Management FRU Information Storage Definition v1.0," Document Revision 1.1, Sep. 27, 1999.

Intel, "Metolious ACPI/Manageability," Specification v1.0, Apr. 30, 1999.

Intel,"IPMI Intelligent Platform Event Trap Format Specification v 1.0," Document Revision 1.0, Dec. 7, 1998.

DMTF, "Common Information Model (CIM) Specification," DSP0004, Version 2.2, Jun. 14, 1999.

Intel, "SMBus Control Method Interface Specification," Version 1.0, Dec. 10, 1999.

Intel, "System Management BIOS Reference Specification," Version 2.3.1, Mar. 1999.

Intel, "System Management Bus Specification," Revision 1.0, Feb. 15, 1995.

Intel, "System Management Bus (SMBus) Specification," SBS Implementers Forum, Revision 2.0, Aug. 3, 2000.

J. Postel, "User Datagram Protocol," ISI Aug. 28, 1980.

"About the 8051 Microcontroller," pp. 1-16.

Intel, "8259A Programmable Interrupt Controller (8259A/8259A-2)," Dec. 1988.

Intel, "Intel® 840 Chipset Platform Design Guide," Oct. 1999.

AMD, "AMD's AlterIT™ Technology for Advanced Systems Management," Publication No. 22297 Rev. A, Dec. 1998.

AMD, "AMD-766™ Peripheral Bus Controller Data Sheet," 23167B Mar. 2001.

* cited by examiner

MICROCOMPUTER BRIDGE FOR REMOTE MANAGEABILITY

BACKGROUND OF THE INVENTION

1. Field of the Invention

This invention relates generally to computing systems, and, more particularly, to a system and method for remote management, such as in a personal computer system.

2. Description of the Related Art

Figure 1A:
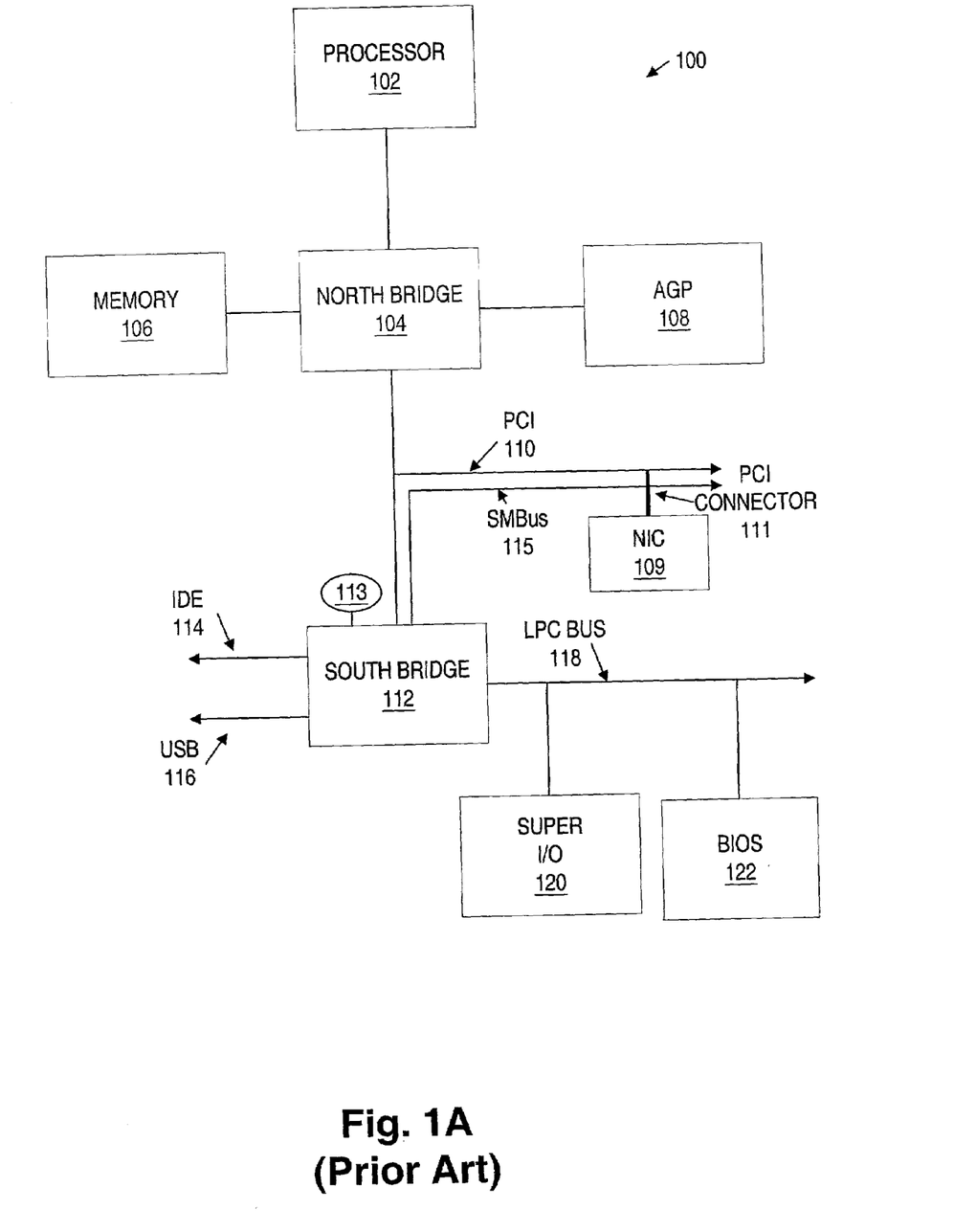
FIG. 1A illustrates a block diagram of a prior art computer system.

FIG. 1A illustrates an exemplary computer system 100. The computer system 100 includes a processor 102, a north bridge 104, memory 106, Advanced Graphics Port (AGP) device 108, a network interface card (NIC) 109, a Peripheral Component Interconnect (PCI) bus 110, a PCI connector 111, a south bridge 112, a battery 113, an AT Attachment (ATA) interface 114 (more commonly known as an Integrated Drive Electronics (IDE) interface), an SMBus 115, a universal serial bus (USB) interface 116, a Low Pin Count (LPC) bus 118, an input/output controller chip (SuperI/O™) 120, and BIOS memory 122. It is noted that the north bridge 104 and the south bridge 112 may include only a single chip or a plurality of chips, leading to the collective term "chipset." It is also noted that other buses, devices, and/or subsystems may be included in the computer system 100 as desired, e.g. caches, modems, parallel or serial interfaces, SCSI interfaces, etc.

The processor 102 is coupled to the north bridge 104. The north bridge 104 provides an interface between the processor 102, the memory 106, the AGP device 108, and the PCI bus 110. The south bridge 112 provides an interface between the PCI bus 110 and the peripherals, devices, and subsystems coupled to the IDE interface 114, the SMBus 115, the USB interface 116, and the LPC bus 118. The battery 113 is shown coupled to the south bridge 112. The Super I/O™ chip 120 is coupled to the LPC bus 118.

The north bridge 104 provides communications access between and/or among the processor 102, memory 106, the AGP device 108, devices coupled to the PCI bus 110, and devices and subsystems coupled to the south bridge 112. Typically, removable peripheral devices are inserted into PCI "slots," shown here as the PCI connector 111, that connect to the PCI bus 110 to couple to the computer system 100. Alternatively, devices located on a motherboard may be directly connected to the PCI bus 110. The SMBus 115 may be "integrated" with the PCI bus 110 by using pins in the PCI connector 111 for a portion of the SMBus 115 connections.

The south bridge 112 provides an interface between the PCI bus 110 and various devices and subsystems, such as a modem, a printer, keyboard, mouse, etc., which are generally coupled to the computer system 100 through the LPC bus 118, or one of its predecessors, such as an X-bus or an Industry Standard Architecture (ISA) bus. The south bridge 112 includes logic used to interface the devices to the rest of computer system 100 through the IDE interface 114, the USB interface 116, and the LPC bus 118. The south bridge 112 also includes the logic to interface with devices through the SMBus 115, an extension of the two-wire inter-IC bus protocol.

Figure 1B:
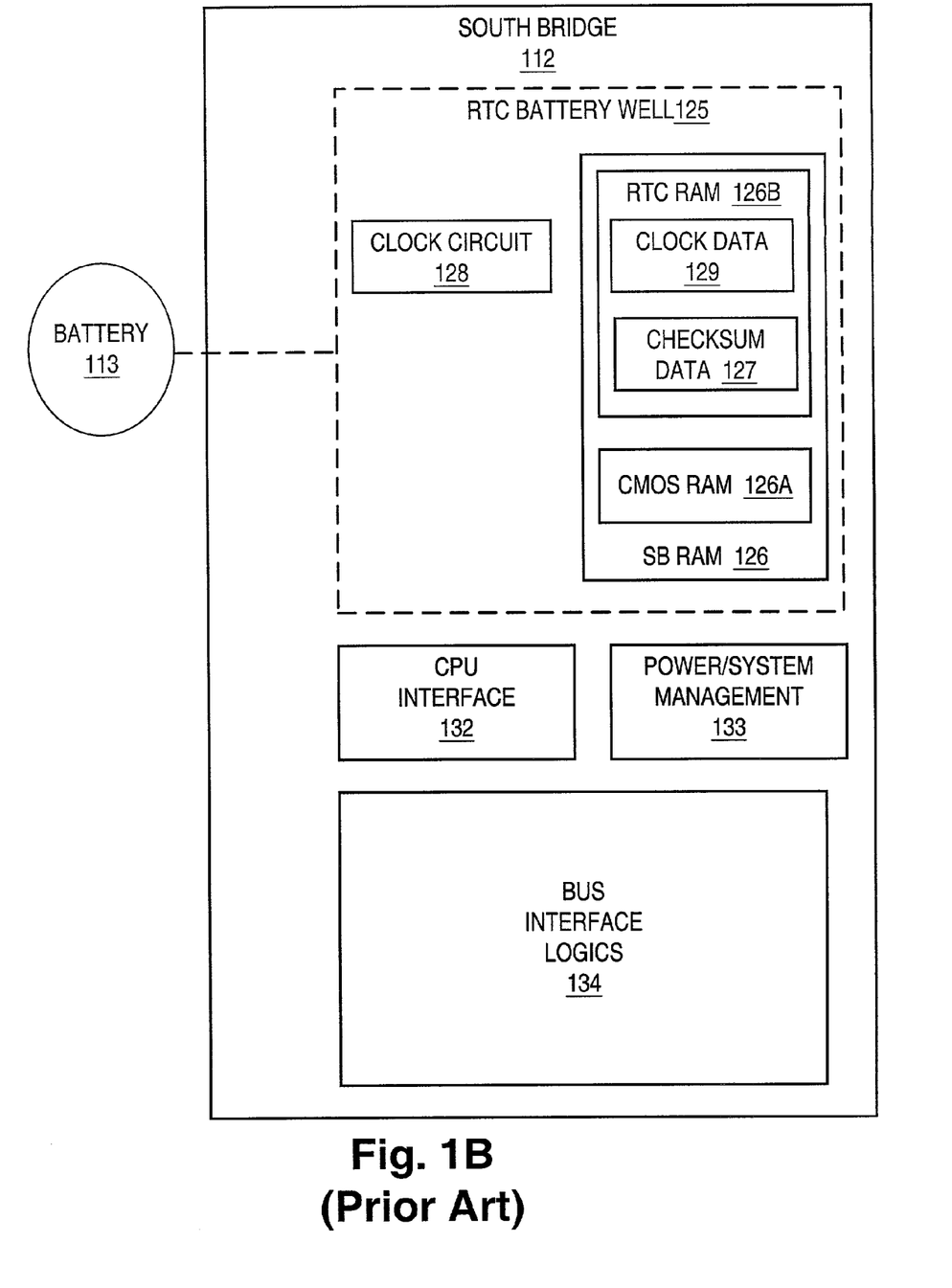
FIG. 1B illustrates a block diagram of a prior art south bridge.

FIG. 1B illustrates certain aspects of the south bridge 112, including reserve power by the battery 113, so-called "being inside the RTC (real time clock) battery well" 125. The south bridge 112 includes south bridge (SB) RAM 126 and a clock circuit 128, both inside the RTC battery well 125. The SB RAM 126 includes CMOS RAM 126A and RTC RAM 126B. The RTC RAM 126B includes clock data 129 and checksum data 127. The south bridge 112 also includes, outside the RTC battery well 125, a CPU interface 132, power and system management units 133, and various bus interface logic circuits 134.

Time and date data from the clock circuit 128 are stored as the clock data 129 in the RTC RAM 126B. The checksum data 127 in the RTC RAM 126B may be calculated based on the CMOS RAM 126A data and stored by BIOS during the boot process, such as is described below, e.g. block 148, with respect to FIG. 2. The CPU interface 132 may include interrupt signal controllers and processor signal controllers.

Figure 1C:
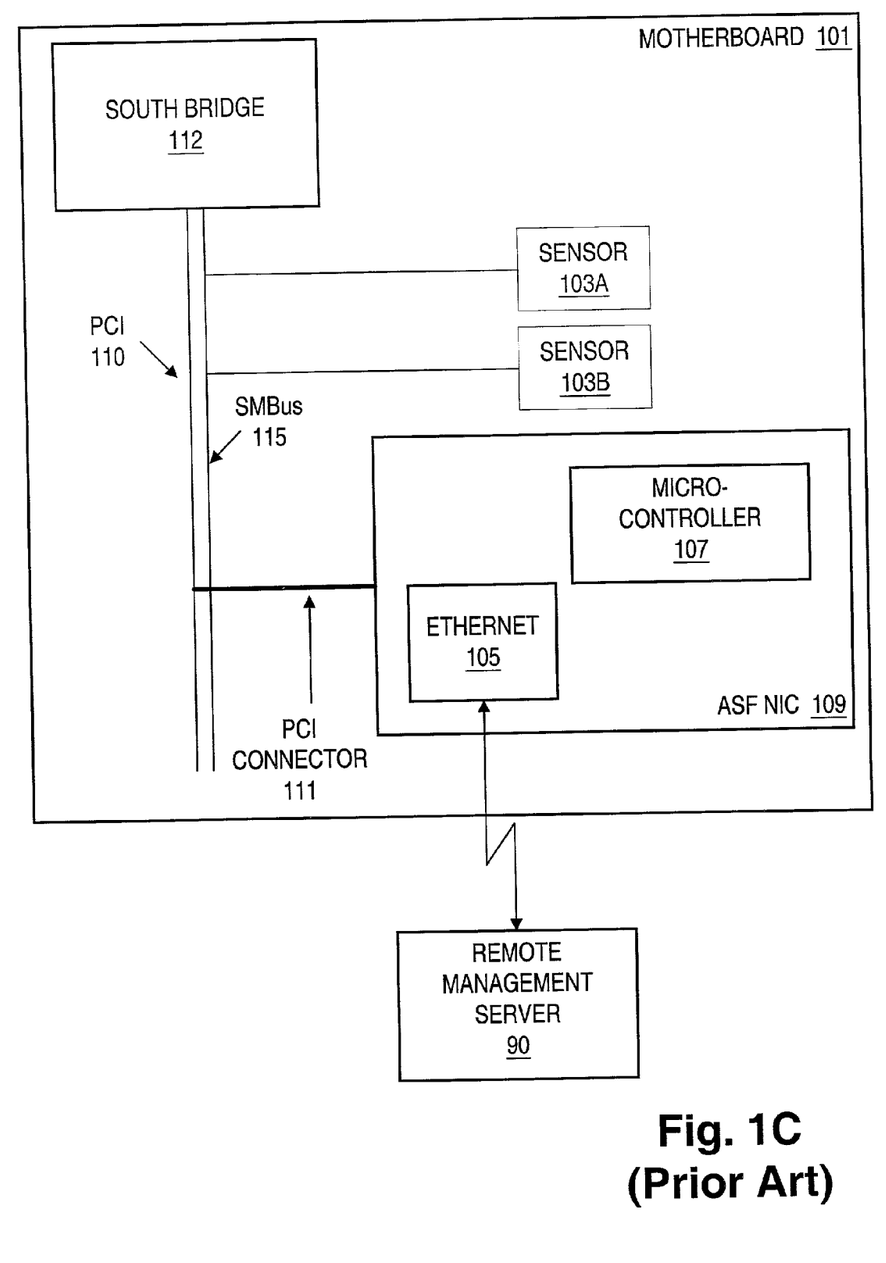
FIG. 1C illustrates a prior art remote management arrangement.

FIG. 1C illustrates a prior art remote management configuration for the computer system 100. A motherboard 101 provides structural and base electrical support for the south bridge 112, the PCI bus 110, the PCI connector 111, the SMBus 115, and sensors 103A and 103B. The NIC 109, a removable add-in card, couples to the motherboard 101, the PCI bus 110, and the SMBus 115 through the PCI connector 111. The NIC 109 includes an Ethernet controller 105 and an ASF microcontroller 107. The Ethernet controller 105 communicates with a remote management server 90, passing management data and commands between the ASF microcontroller 107 and the remote management server 90. The remote management server 90 is external to the computer system 100

An industry standard specification, generally referred to as the Alert Standard Format (ASF) Specification, defines one approach to "system manageability" using the remote management server 90. The ASF Specification defines remote control and alerting interfaces capable of operating when an operating system of a client system, such as the computer system 100, is not functioning. Generally, the remote management server 90 is configured to monitor and control one or more client systems. Typical operations of the ASF alerting interfaces include transmitting alert messages from a client to the remote management server 90, sending remote control commands from the remote management server 90 to the client(s) and responses from the client(s) to the remote management server 90, determining and transmitting to the remote management server 90 the client-specific configurations and assets, and configuring and controlling the client(s) by interacting with the operating system (s) of the client(s). In addition, the remote management server 90 communicates with the ASF NIC 109 and the client(s)' ASF NIC 109 communicates with local client sensors 103 and the local client host processor.

When the client has an ACPI-aware operating system functioning, configuration software for the ASF NIC 109 runs during a "one good boot" to store certain ASF, ACPI (Advanced Configuration and Power Interface), and client configuration data.

The transmission protocol in ASF for sending alerts from the client to the remote management server 90 is the Platform Event Trap (PET). A PET frame consists of a plurality of fields, including GUID (globally unique identifier), sequence number, time, source of PET frame at the client, event type code, event level, sensor device that caused the alert, event data, and ID fields.

Many events may cause an alert to be sent. The events may include temperature value over or under a set-point, voltage value over or under a set-point, fan actual or predicted failure, fan speed over or under a set-point, and physical computer system intrusion. System operation errors may also be alerts, such as memory errors, data device errors, data controller errors, CPU electrical characteristic mismatches, etc. Alerts may also correspond to BIOS or firmware progression during booting or initialization of any part of the client. Operating system (OS) events may also generate alerts, such as OS boot failure or OS timeouts. The ASF Specification provides for a "heartbeat" alert with a programmable period typically one minute but not to exceed 10 minutes, when the client does not send out the heartbeat, or "I am still here," message.

Client control functions are implemented through a remote management and control protocol (RCMP) that is a user datagram protocol (UDP) based protocol. RCMP is used when the client is not running the operating system. RCMP packets are exchanged during reset, power-up, and power-down cycles, each having a different message type. The remote management server 90 determines the ASF-RCMP capabilities of the client(s) by a handshake protocol using a presence-ping-request that is acknowledged by the client(s) and followed-up with a presence-pong that indicates the ASF version being used. The remote management server 90 then sends a request to the client to indicate the configuration of the client, which the client acknowledges and follows with a message giving the configuration of the client as stored in non-volatile memory during the "one good boot." The RCMP packets include a contents field, a type field, an offset field, and a value field.

RCMP message transactions involve a request from the remote management server 90, a timed wait for an acknowledgement followed by a second timed wait for a response. If either of the time limits for the acknowledgement or the response is exceeded, then the remote management server 90 knows that either the client needs some of the packets resent or the client has lost contact due to failure of either the client or the communications link.

The ASF NIC 109 must be able to report its IP (Internet protocol) address (or equivalent) without the intervention of the operating system. Thus, the ASF NIC 109 must be able to receive and reply to ARP (Address Resolution Protocol) requests with the operating system, not interfere with ARP packets when the operating system is running, and wake-up for ARP packets when configured to do so. Note that ACPI includes waking-up for ARP packets as a standard configuration.

The following information is sent to the remote management server 90 from the client as an indication of the configuration of the client: an ACPI description table identifying sensors and their characteristics, ASF capabilities and system type for PET messages, and the client's support for RMCP and the last RCMP command; how the client configures an optional operating system boot hang watchdog timer; and the SMBIOS identification of the UUID/GUID for PET messages. ASF objects follow the ASL (ACPI Software Language) naming convention of ACPI.

Figure 2:
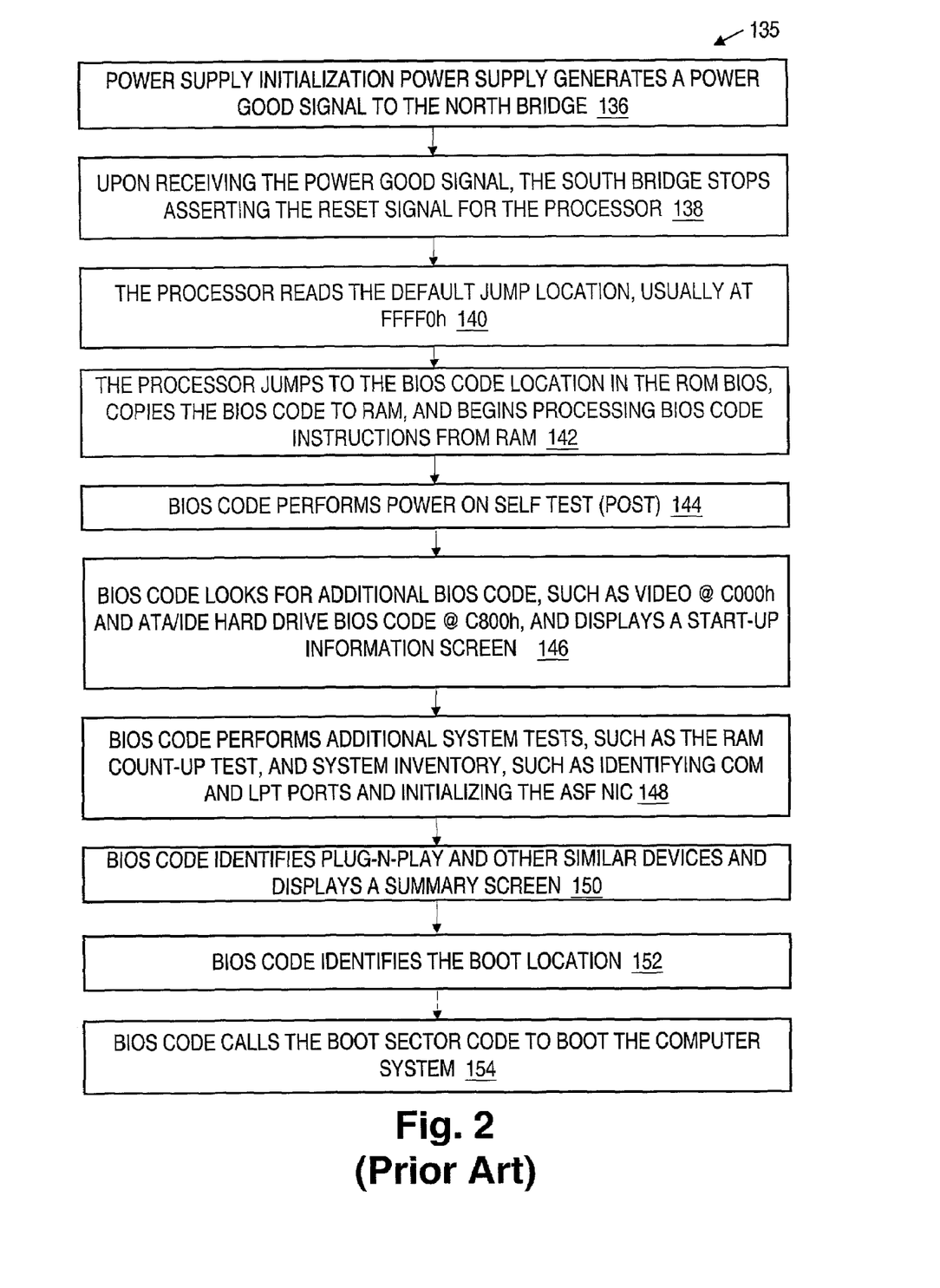
FIG. 2 illustrates a flowchart of a prior art method for booting a computer system using code stored in ROM.

In FIG. 2, a flowchart of a conventional method of initializing a computer system using code stored in the BIOS 122 is shown. During initialization of the power supply, the power supply generates a power good signal to the north bridge 104, in block 136. Upon receiving the power good signal from the power supply, the south bridge 112 (or north bridge 104) stops asserting the reset signal for the processor 102, in block 138.

During initialization, the processor 102 reads a default jump location, in block 140. The default jump location in memory is usually at a location such as FFFF0h. The processor 102 performs a jump to the appropriate BIOS code location (e.g. FFFF0h) in the ROM BIOS 122, copies the BIOS code to the RAM memory 106, and begins processing the BIOS code instructions from the RAM memory 106, in block 142. The BIOS code, processed by the processor 102, performs a power-on self test (POST), in block 144.

The BIOS code next looks for additional BIOS code, such as from a video controller, IDE controller, SCSI controller, etc. and displays a start-up information screen, in block 146. As examples, the video controller BIOS is often found at C00h, while the IDE controller BIOS code is often found at C800h. The BIOS code may perform additional system tests, such as a RAM memory count-up test, and a system inventory, including identifying COM (serial) and LPT (parallel) ports, in block 148. The additional system tests may include ASF, ACPI, and Ethernet initializations, including initiating a communications link with the remote management server 90. The BIOS code also identifies plug-and-play devices and other similar devices and then displays a summary screen of devices identified, in block 150.

The BIOS code identifies the boot location, and the corresponding boot sector, in block 152. The boot location may be on a floppy drive, a hard drive, a CDROM, a remote location, etc. The BIOS code next calls the boot sector code at the boot location to boot the computer system, such as with an operating system, in block 154.

It is noted that for a cold boot or a hard (re)boot, all or most of the descriptions given in blocks 136–154 may occur. During a warm boot or a soft (re)boot the BIOS code usually jumps from block 142 into block 148, skipping the POST, memory tests, etc.

Remote management techniques such as ASF are predicated on the NIC 109 being installed for "one good boot" of the operating system so that initialization of the remote management hardware and/or firmware can be supervised by the operating system. Improvements in remote management for personal computers may speed the initialization of remote management hardware and/or firmware and may lessen the dependence on the operating system. A computer system 100 with a long boot time slows productivity and, at a minimum, irritates users. It would be desirable to shorten boot times if possible.

SUMMARY OF THE INVENTION

In one aspect of the present invention, an integrated circuit is disclosed. The integrated circuit includes a first bus interface logic for coupling to a first external bus, an ASF management engine configured to receive ASF sensor data over the first external bus; and an indicator configured to indicate a master mode or a slave mode for the ASF management engine. In the master mode, the ASF management engine is further configured to actively poll for the ASF sensor data over the first external bus. In the slave mode, the ASF management engine is not further configured to actively poll for the ASF sensor data over the first external bus.

In another aspect of the present invention, a method for performing ASF alerting and control in a client computer system is disclosed. The method also includes determining if an ASF NIC is present in the client computer system. The method further includes operating the ASF south bridge in a slave mode if the ASF NIC is determined to be present in the client computer system. The method also includes operating the ASF south bridge in a master mode if the ASF NIC is not determined to be present in the client computer system.

BRIEF DESCRIPTION OF THE DRAWINGS

The invention may be understood by reference to the following description taken in conjunction with the accompanying drawings, in which like reference numerals identify similar elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will, of course, be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. The use of a letter in association with a reference number is intended to show alternative embodiments or examples of the item to which the reference number is connected.

The following co-pending U.S. Patent Applications are hereby incorporated by reference in their entireties, as if set forth fully herein:

[LPC Extension Application] "Method And Apparatus For Extending Legacy Computer Systems", U.S. patent application Ser. No. 09/544,858, filed on Apr. 7, 2000, whose inventor is Dale E. Gulick; and

[Secure Execution Mode Applications] U.S. patent application Ser. No. 09/852,372, entitled, "Secure Execution Box and Method," filed on May 10, 2001, whose inventors are Dale E. Gulick and Geoffrey S. Strongin;

U.S. patent application Ser. No. 09/852,942, entitled, "Computer System Architecture for Enhanced Security and Manageability," filed on May 10, 2001, whose inventors are Geoffrey S. Strongin and Dale E. Gulick;

U.S. patent application Ser. No. 09/853,395, entitled, "Enhanced Security and Manageability using Secure Storage in a Personal Computer System," filed on May 11, 2001, whose inventors are Geoffrey S. Strongin and Dale E. Gulick;

U.S. patent application Ser. No. 09/853,446, entitled, "Resource Sequester Mechanism," filed on May 11, 2001, whose inventor is and Dale E. Gulick;

U.S. patent application Ser. No. 09/853,447, entitled, "Integrated Circuit for Security and Manageability," filed on May 11, 2001, whose inventors are Dale E. Gulick and Geoffrey S. Strongin;

U.S. patent application Ser. No. 09/853,225, entitled, "System Management Mode Duration and Management," filed on May 11, 2001, whose inventors are Geoffrey S. Strongin and Dale E. Gulick;

U.S. patent application Ser. No. 09/853,226, entitled, "Mechanism for Closing Back Door Access Mechanisms in Personal Computer Systems," filed on May 11, 2001, whose inventor is Geoffrey S. Strongin;

U.S. patent application Ser. No. 09/854,040, entitled, "Cryptographic Randomness Register for Computer System Security," filed on May 11, 2001, whose inventor is Dale E. Gulick;

U.S. patent application Ser. No. 09/853,465, entitled, "Cryptographic Command-Response Access to a Memory in a Personal Computer System," filed on May 11, 2001, whose inventor is Geoffrey S. Strongin;

U.S. patent application Ser. No. 09/853,443, entitled, "Protection Mechanism for Biometric Input Data," filed on May 11, 2001, whose inventors are Dale E. Gulick and Geoffrey S. Strongin;

U.S. patent application Ser. No. 09/853,437, entitled, "Personal Computer Security Mechanism," filed on May 11, 2001, whose inventors are Geoffrey S. Strongin and Dale E. Gulick;

U.S. patent application Ser. No. 09/853,335, entitled, "Asset Sharing between Host Processor and Security Hardware," filed on May 11, 2001, whose inventors are Geoffrey S. Strongin and Dale E. Gulick;

U.S. patent application Ser. No. 09/853,234, entitled, "Interruptable and Re-enterable System Management Mode Programming Code," filed on May 11, 2001, whose inventors are Geoffrey S. Strongin and Dale E. Gulick;

U.S. patent application Ser. No. 09/871,084, entitled, "Locking Mechanism Override and Disable for Personal Computer ROM Access Protection," filed on May 30, 2001, whose inventors are Frederick D. Weber and Dale E. Gulick;

U.S. patent application Ser. No. 09/871,511, entitled, "Monotonic Counter Mechanism for Computer System Security," filed on May 30, 2001, whose inventors Frederick D. Weber and Dale E. Gulick;

U.S. patent application Ser. No. 09/870,890, entitled, "Secure Booting of a Personal Computer System," filed on May 30, 2001, whose inventors are Geoffrey S. Strongin, Dale E. Gulick, and Frederick Weber; and U.S. patent application Ser. No. 09/870,889, entitled, "External Locking Mechanism for Personal Computer Memory Locations, filed on May 30, 2001, whose inventors are Geoffrey S. Strongin, Dale E. Gulick, and Frederick Weber.

The following non-patent documents are hereby incorporated by reference in their entirety, without prejudice and without disclaimer, as if set forth fully herein:

[ASF] Alert Standard Format Specification, 1.03, 20 Jun. 2001, DSP0114, and earlier version, http://www.dmtf.org/spec/asf.html;

[ACPI] Advanced Configuration and Power Interface Specification, 2.0, 27 Jul. 2000, and earlier version, http://www.teleport.com/~acpi/spec.htm;

[RFC1157] A Simple Network Management Protocol, http://www.ietf.org/rfc/rfc1157.txt;

[CIM] CIM Standards, http://www.dmtf.org/spec/cims.html;

[IPMI] Intelligent Platform Management Interface Specification v1.0, rev 1.1, Aug. 26, 1999, and earlier versions, http://developer.intel.com/design/servers/ipmi/;

[RFC1188] IP and ARP on FDDI Networks, http://www.ietf.org/rfc/rfc1180.txt;

[FRU] IPMI Field Replaceable Unit (FRU) Information Storage Definition, v1.0, 16 Sep. 1998, and earlier versions, ftp://download.intel.com/design/servers/ipmi/fru1010.pdf;

[MTLS] Metolious ACPI/Manageability Specification, v1.0, 30 Apr. 1999, http://developer.intel.com/ial/metolious/index.htm;

[NDCPM] Network Device Class Power Management Reference Specification, v1.0a, 21 Nov. 1997, http://www.microsoft.com/hwdev/specs/PMref/PMnetwork.htm;

[PET] Platform Event Trap Specification, v1.0, 7 Dec. 1998, and earlier versions, ftp://download.intel.com/design/servers/ipmi/pet100.pdf,

[SCMIS] SMBus Control Method Interface Specification, v1.0, 10 Dec. 1999, and earlier versions, http://www.smbus.org/specs/index.html;

[SMBIOS] System Management BIOS Reference Specification, v2.3.1, 16 Mar. 1999, and earlier versions, ftp://download.intel.com/ial/wfm/smbios.pdf;

[SMBUS_2.0] System Management Bus (SMBus) Specification, v2.0, 03 Aug. 2000, and earlier versions, http://www.smbus.org/specs/index.html; and

[RFC_UDP] User Datagram Protocol, RFC 768, http://www.ietf.org/rfc/rfc0768.txt

Figure 3A:
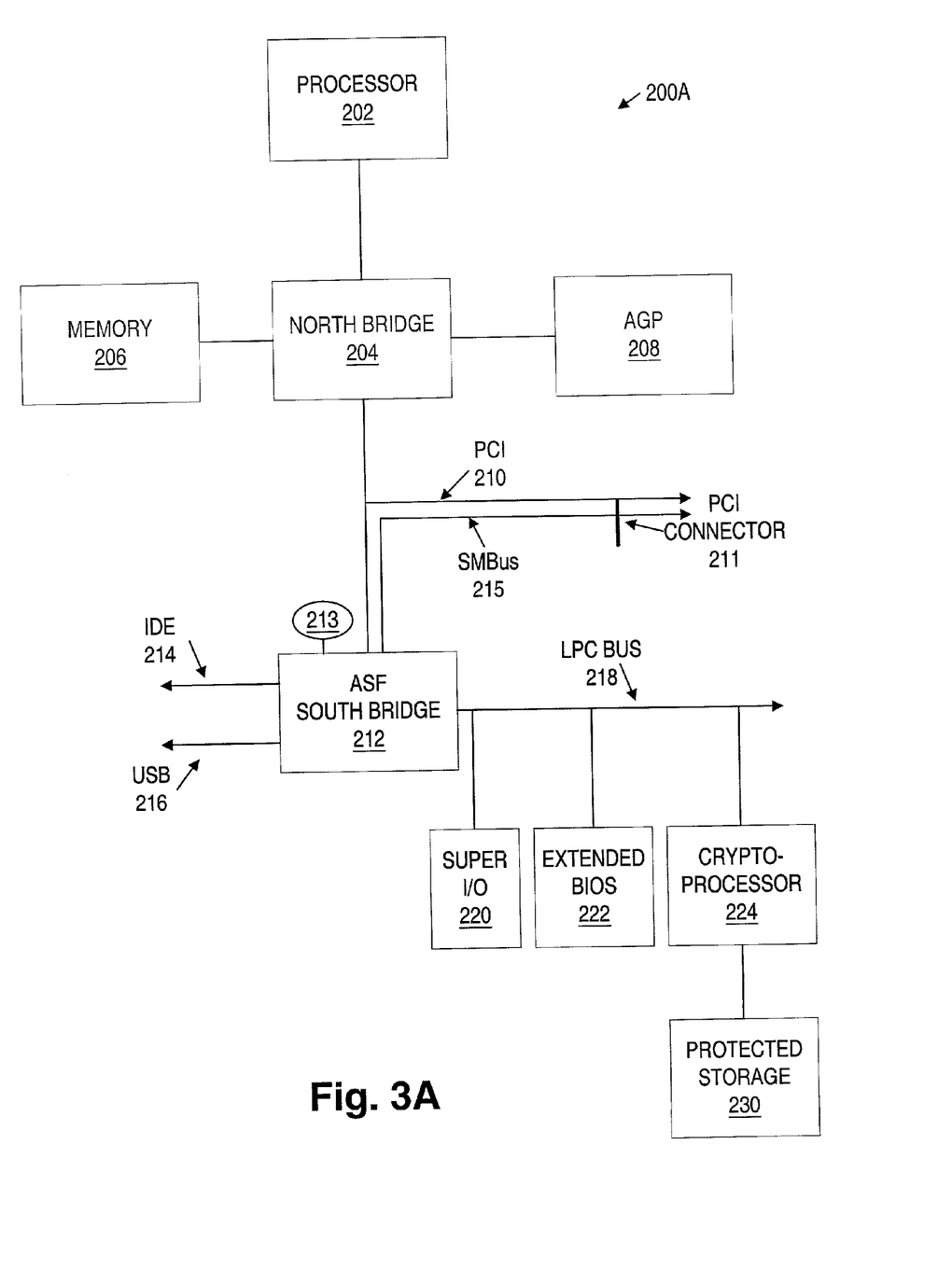
FIGS. 3A and 3B illustrate block diagrams of embodiments of computer systems having remote management arrangements, according to various aspects of the present invention.
Figure 3B:
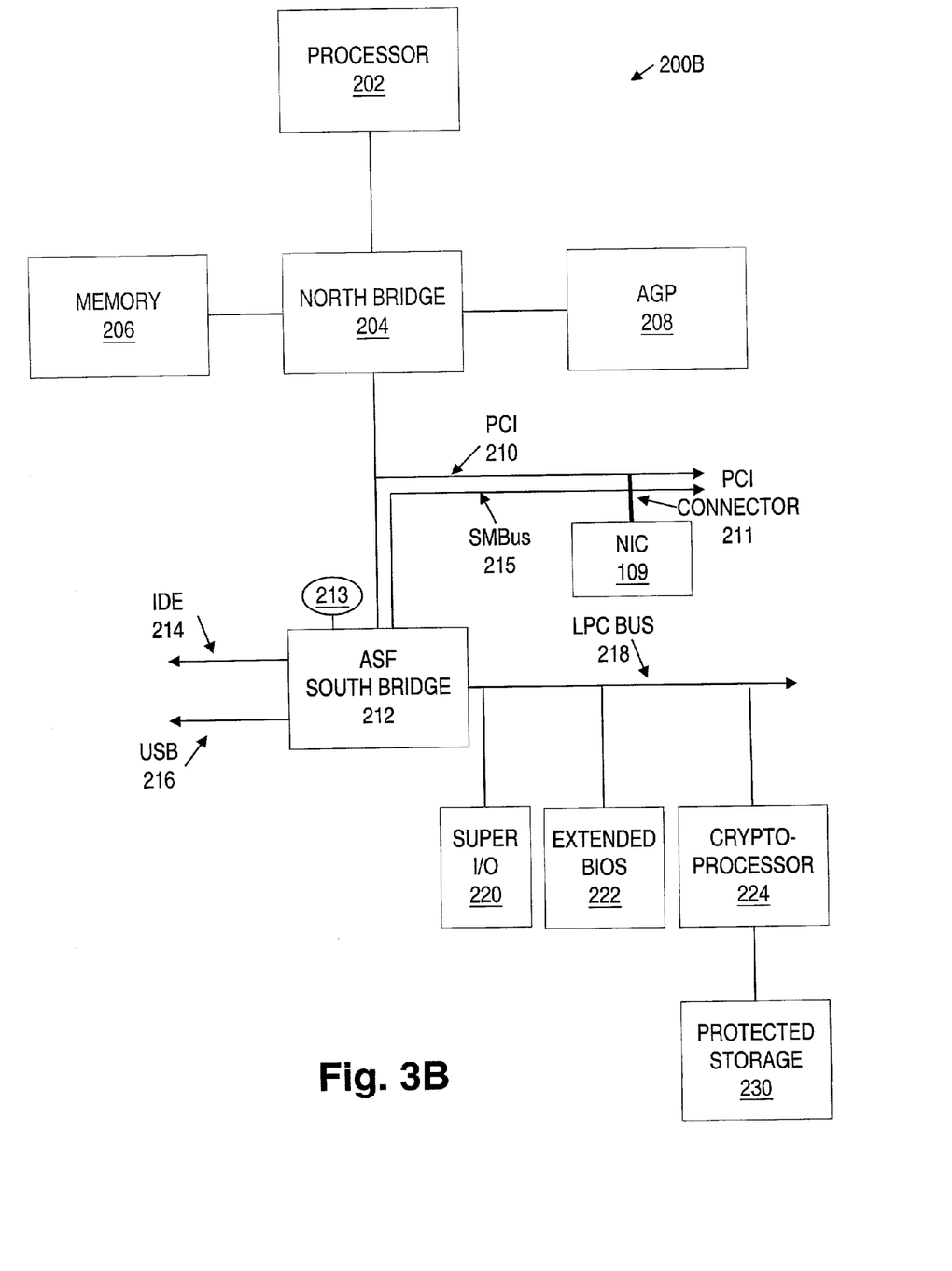

Turning now to FIGS. 3A and 3B, block diagrams of embodiments of computer systems 200A and 200B having remote management arrangements are shown, according to various aspects of the present invention. In FIG. 3A, an ASF south bridge 212 may include integrated ASF, ACPI, and/or Ethernet capabilities for improved remote manageability.

The computer system 200A of FIG. 3A includes a processor 202, a north bridge 204, memory 206, Advanced Graphics Port (AGP) device 208, a PCI bus 210, a PCI connector 211, the ASF south bridge 212, a battery 213, an AT Attachment (ATA) interface 214, an SMBus 215, a USB interface 216, an LPC bus 218, an input/output controller chip (SuperI/O™) 220, extended BIOS memory 222, and, optionally, a crypto-processor 224 and protected storage 230. It is noted that the north bridge 204 and the ASF south bridge 212 may include only a single chip or a plurality of chips in the "chipset." It is also noted that other buses, devices, and/or subsystems may be included in the computer system 200A as desired, e.g. caches, modems, parallel or serial interfaces, SCSI interfaces, etc.

The processor 202 is coupled to the north bridge 204. The north bridge 204 provides an interface between the processor 202, the memory 206, the AGP device 208, and the PCI bus 210. The ASF south bridge 212 provides an interface between the PCI bus 210 and the peripherals, devices, and subsystems coupled to the IDE interface 214, the SMBus 215, the USB interface 216, and the LPC bus 218. The battery 213 is shown coupled to the ASF south bridge 212. The Super I/O™ chip 220, the extended BIOS 222, and the crypto-processor 224 are coupled to the LPC bus 218. The protected storage 230 is coupled through the crypto-processor 224.

The north bridge 204 provides communications access between and/or among the processor 202, memory 206, the AGP device 208, devices coupled to the PCI bus 210 and devices and subsystems coupled to the ASF south bridge 212. Typically, removable peripheral devices are inserted into PCI "slots," shown here as the PCI connector 211, that connect to the PCI bus 210 to couple to the computer system 200A. Alternatively, devices located on a motherboard may be directly connected to the PCI bus 210. The SMBus 215 is "integrated" with the PCI bus 210 by using pins in the PCI connector 211 for a portion of the SMBus 215 connections.

The ASF south bridge 212 provides an interface between the PCI bus 210 and various devices and subsystems, such as a modem, a printer, keyboard, mouse, etc., which are generally coupled to the computer system 200A through the LPC bus 218 (or its predecessors, such as the X-bus or the ISA bus). The ASF south bridge 212 includes logic used to interface the devices to the rest of computer system 200A through the IDE interface 214, the SMBus 215, preferably supporting masters external to the ASF south bridge 212, the USB interface 216, and the LPC bus 218.

It is also noted that the operations of the LPC bus 218 may correspond to the prior art Low Pin Count Interface Specification Revision 1.0 of Sep. 29, 1997. The operations of the LPC bus 218 may also correspond to the extended LPC bus disclosed in the LPC Extension Application previously incorporated herein by reference.

The extended BIOS 222 includes additional memory locations different from or in addition to those memory locations in the BIOS memory 122. The additional memory locations may have specific read/write permissions and/or be secure memory locations. Additional details may be found in the Secure Execution Mode Applications previously incorporated herein by reference. Memory addressing for the extended BIOS 222 may be as taught in the LPC Extension Application previously incorporated herein by reference. The crypto-processor 224 may provide security for the protected storage 230. Various embodiments for accessing the protected storage through the crypto-processor 224 are provided in the Secure Execution Mode Applications previously incorporated herein by reference.

As mentioned above, the ASF south bridge 212 may include integrated ASF, ACPI, and/or Ethernet functionality, according to various aspects of the present invention. As there is no ASF NIC 109 in the computer system 200A, according to one aspect of the present invention, the ASF south bridge 212 recognizes that it must be a master ASF controller for the computer system 200A, during a power-up cycle. The computer system 200A may advantageously boot faster than the computer system 100 by initiating the ASF and/or ACPI assets in the ASF south bridge 212 during the main portion of the BIOS loading since the ASF, ACPI, and/or Ethernet hardware are known to the BIOS code writer before the BIOS code is written. The BIOS code itself may then be enlarged to include any or all ASF, ACPI, and/or Ethernet initialization data and/or firmware. Additional details of various embodiments of the present invention are given below.

In FIG. 3B, the computer system 200B differs from the computer system 200A in that the computer system 200B includes the ASF NIC 109 at the PCI connector 211. In the computer system 200B, the ASF south bridge 212, according to one aspect of the present invention should recognize that it should be an ASF slave to the ASF NIC 109.

The Secure Execution Mode Applications previously incorporated herein by reference teach that power management functions may be performed inside a secure execution mode (SEM), including using security hardware integrated into the south bridge. One current standard for power management and configuration is the ACPI Specification. According to the ACPI specification, control methods, a type of instruction, tell the computer system to perform an operation. The ACPI specification does not explain how to carry out any of the instructions. The ACPI specification only defines the calls, and the software must be written to carry out the calls in a proscribed manner. The proscribed manner of the ACPI specification is very restrictive. One cannot access some registers in the hardware. To access those registers, one can generate an SMI# (System Management Interrupt) to enter SMM and read these registers, as taught in the Secure Execution Mode Applications previously incorporated herein by reference. As power management has the potential to be abused e.g. change the processor voltage and frequency, raised above operating limits to destroy the processor, or lowered below operating limits leading to a denial of service, ACPI calls should be carried out in a secure manner, such as inside SEM.

Inside SEM, each ACPI request can be checked against some internal rules for safe behavior. Using terminology more completely described in the Secure Execution Mode Applications previously incorporated herein by reference, the ACPI request would be placed in an "inbox" (incoming-only memory locations in the south bridge) of a "mailbox" (one-direction-only memory locations in the south bridge), parameter values read from the inbox, the ACPI request evaluated using the inbox parameters for acceptability, and then either fulfill the request or not, based on the evaluation results. For additional details of various embodiments, see the Secure Execution Mode Applications previously incorporated herein by reference, including FIGS. 6, 42A and 42B therein.

System Management Mode (SMM) is a mode of operation in the computer system that was implemented to conserve power. The SMM was created for the fourth generation x86 processors, and is different from x86 operating mode. As newer x86 generation processors have appeared, the SMM has become relatively transparent to the operating system. That is, computer systems enter and leave the SMM with little or no impact on the operating system.

Figure 4:
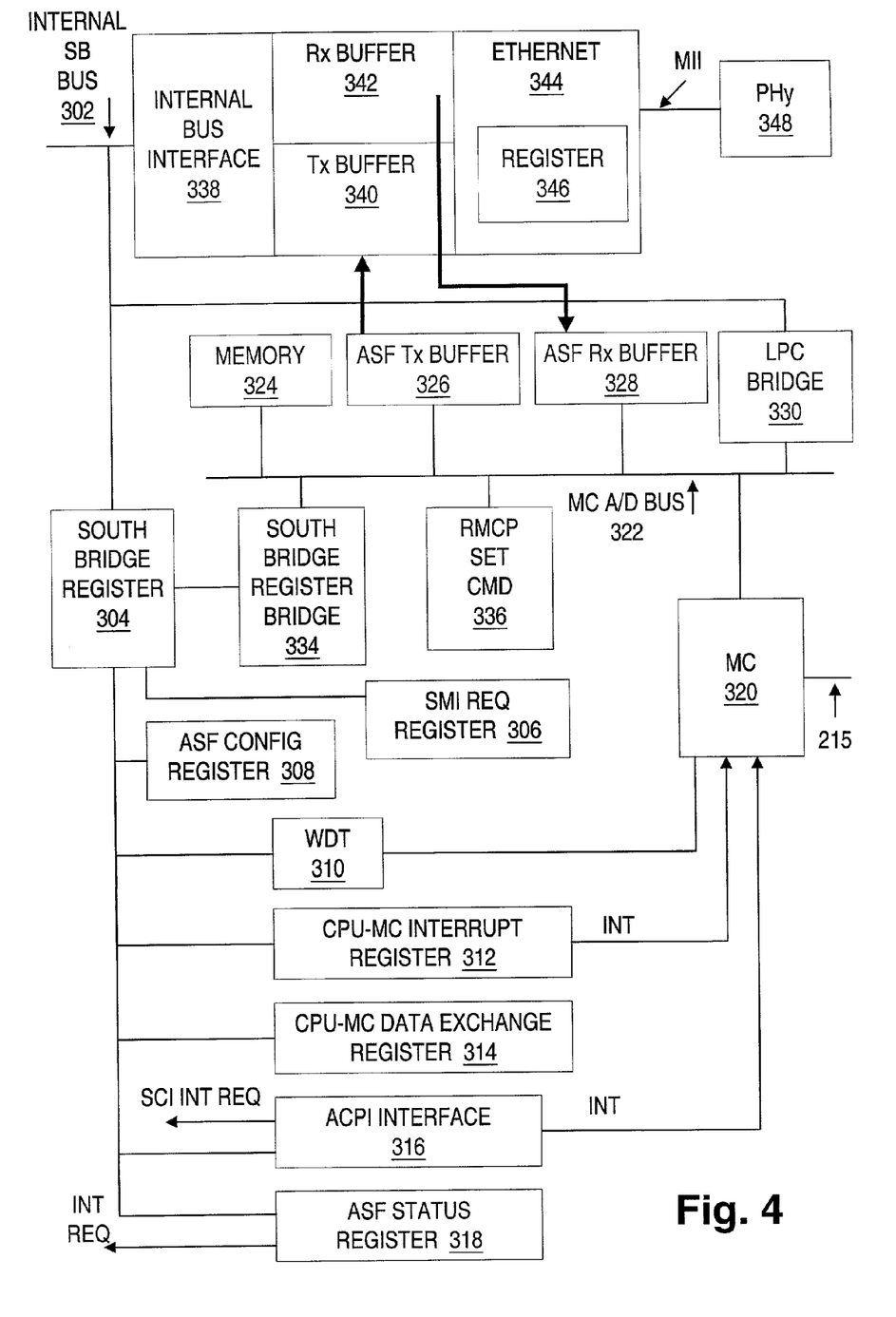
FIG. 4 illustrates a block diagram of an embodiment of an ASF south bridge including integrated ASF, ACPI, and/or Ethernet capabilities, according to various aspects of the present invention.

In FIG. 4, one embodiment of the ASF south bridge 212 is illustrated, according to various aspects of the present invention. As shown, an internal south bridge bus 302 couples a south bridge register 304 with an internal bus interface 338 of an Ethernet controller 344 and an LPC bridge 330. The south bridge register 304 also couples to an SMI request register 306, an ASF configuration register 308, a watchdog timer (WDT) 31, a CPU-MC (microcontroller) interrupt register 312, a CPU-MC data exchange register 314, an ACPI interface 316, an ASF status register 318, and a south bridge register bridge 334. The south bridge register bridge 334 also couples to an MC address/data (A/D) bus 322.

Also coupled to the MC A/D bus 322 are a memory 324, an ASF transmit (Tx) buffer 326, an ASF receive (Rx) buffer 328, the LPC bridge 330, an RMCP set command unit 336, and an embedded microcontroller 320. The MC 320 is also coupled to the WDT 310 and coupled to receive an interrupt (INT) from the CPU-MC interrupt register 312 and the ACPI interface 316. The ACPI interface 316 also generates an SCI interrupt request. The ASF status register 318 also generates an interrupt request. The embedded Ethernet controller also includes a Rx buffer coupled to the ASF Rx buffer 328, a Tx buffer 340 coupled to the ASF Tx buffer 326, and an Ethernet core 344, including a register 346. The Ethernet core 344 is shown coupled to a PHy 348 through an MII (Machine Independent Interface). The PHy 348 may be external to the ASF south bridge 212.

The MC 320 couples to the SMBus 215, not shown. The MC 320 may use software-drive I/O ports for the SMBus protocol, according to one aspect of the present invention, using so-called "chapter 13 interfaces" of the ACPI Specification, named from their definition given in chapter 13 of the ACPI Specification. In this embodiment, the processor (CPU) 202 can master the SMBus 215. The MC 320 may store assignable addresses in the memory 324, with fixed motherboard-resident legacy sensor addresses store in the BIOS ROM 122 or the extended BIOS 222. When the ASF NIC 109 is present and the ASF south bridge 212 is operating in slave mode, any sensors internal to the ASF south bridge 212 should be visible to the ASF NIC 109.

The embedded Ethernet controller, including the Ethernet core 344, may be configured at boot time from either BIOS code stored in the extended BIOS or by the MC 320 reading values from an EEPROM, not shown, and writing the register 346. It is noted that the register 346 may include a plurality of storage locations or a plurality of registers each with one or more storage locations.

It is noted that the MC 320 may have some number of general purpose I/O pins, not shown. The input pins may be used to generate panic interrupts to the MC 320. The output pins may be used to control motherboard functions that are desired when the processor 202 may be "hung" and for ASF slave mode panic generation. The ASF slave mode panic generation may substitute for "pushes" of sensor 103 outputs. The general purpose I/O inputs may generate an interrupt to the MC 320 or be polled by the MC 320, as desired.

The SMI request register 306 is configured to generate an SMI interrupt when an interrupt vector is written to the SMI request register 306. The interrupt vector is passed to an interrupt controller, not shown. It is noted that the SMI request register 306 may be in addition to or the same as the corresponding SMM initiator or SMM initiation register of the Secure Execution Mode Applications previously incorporated herein by reference.

The memory 324 may include ROM and/or RAM, as desired. The MC 320 may read configuration data from ROM in the memory 324 and shadow the configuration data in RAM in the memory 324. The configuration data may be stored in the extended BIOS 222 and shadowed in the RAM. Note that the ACPI interface 316 couples to the power/system management core 233, shown in FIG. 3, in the ASF south bridge 212.

In one embodiment, the MC 320 is a conventionally available microcontroller, such as an embedded 8051 microcontroller. The 8051 microcontroller and related microcontrollers have well-known functionality in the art. Typical functionality of the 8051 microcontroller includes a central processing unit with a Boolean processor optimized for one-bit operations, five or six interrupts, with two external and two priority levels, two or three timers or counters, often 16-bit, a programmable full-duplex serial port with data rate defined by one of the timers, 32 I/O lines often as four 8-bit ports, RAM, and optional ROM. The 8051 microcontroller is known to exist in a multitude of varieties, each variation being embraced herein. Other microcontroller and microprocessor designs are also contemplated as the MC 320.

Figure 5:
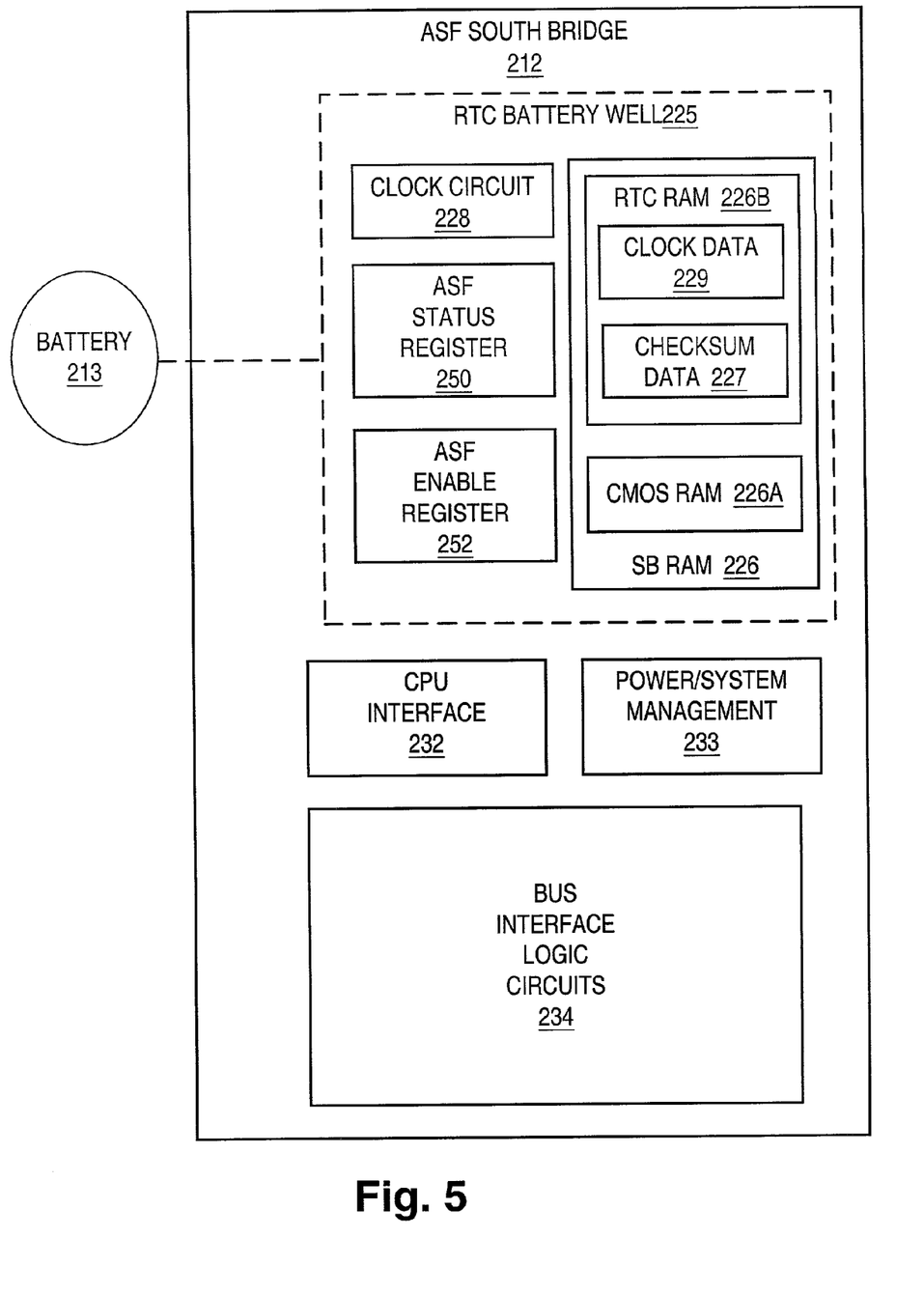
FIG. 5 illustrates a block diagram of an embodiments of the ASF south bridge including ASF registers in the RTC battery well of the ASF south bridge, according to various aspects of the present invention.

FIG. 5 illustrates the RTC battery well 225 of the ASF south bridge 212, according to the present invention. In addition to SB RAM 226, divided into CMOS RAM 226A and RTC RAM 226B, the RTC battery well 225 includes a clock circuit 228, a status register 250, and an enable register 252. The RTC RAM 226B includes checksum data 227 and clock data 229. The battery 213 is coupled to provide power to the contents of the RTC battery well 225. The status register 250 is configured to store status information for the ASF capabilities of the computer system 200. The enable register 252 is configured to store a master bit that, when set, indicates that the ASF NIC 109 is not present. A slave bit may alternatively be stored that, when set, indicates that the ASF NIC 109 is present. It is noted that ASF registers 250 and 252 shown in FIG. 5 may each separately include one or more storage locations or a plurality of registers each having one or more storage locations.

The ASF south bridge 212 also includes, outside the RTC battery well 225, a CPU interface 232, power and system management units 233, and various bus interface logic circuits 234. Time and date data from the clock circuit 228 are stored as the clock data 229 in the RTC RAM 226B. The checksum data 227 in the RTC RAM 226B may be calculated based on the CMOS RAM 226A data and stored by the BIOS code during the boot process. The CPU interface 232 may include interrupt signal controllers and processor signal controllers. The power and system management units 233 may include an ACPI controller.

Figure 6:
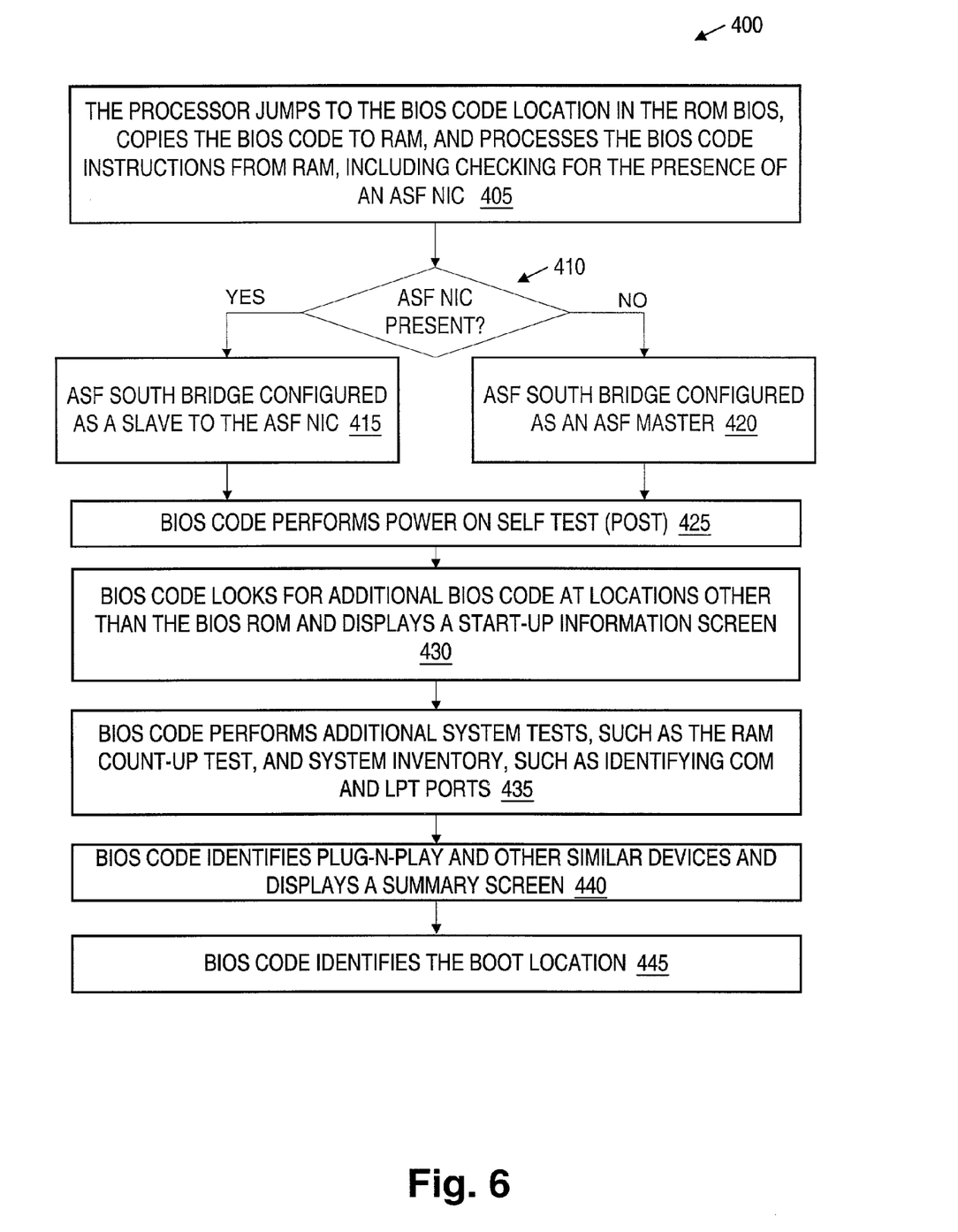
FIG. 6 illustrates a flowchart an embodiment of a method for booting a computer system including the ASF south bridge of FIG. 4, according to one aspect of the present invention.

FIG. 6 illustrates a flowchart of an embodiment of a method of initializing a computer system including the ASF south bridge. Various steps shown in FIG. 2 that are not shown or replaced in FIG. 6 are also contemplated as included in FIG. 6.

During initialization, the processor 202 reads the default jump location. The default jump location in memory is usually at a location such as FFFF0h. The processor 202 performs a jump to the appropriate BIOS code location (e.g. FFFF0h) in the ROM BIOS 222, copies the BIOS code to the RAM memory 206, and begins processing the BIOS code instructions from the RAM memory 206, in block 405. Processing the BIOS code instructions includes checking for the presence of an ASF NIC 109.

If the ASF NIC 109 is present, in decision block 410, then the method continues with block 415. If the ASF NIC 109 is not present, in decision block 410, then the method continues with block 420.

If the ASF NIC 109 is present, then the ASF south bridge 212 is configured as a slave to the ASF NIC 109, in block 415. If the ASF NIC 109 is not present, then the ASF south bridge 212 is configured as a master ASF device, in block 420. Blocks 415 and 420 are each followed by block 425.

The BIOS code, processed by the processor 202, performs a power-on self test (POST), in block 425. The BIOS code next looks for additional BIOS code, such as from a video controller, IDE controller, SCSI controller, etc. and displays a start-up information screen, in block 430. The BIOS code may perform additional system tests, such as a RAM memory count-up test, and a system inventory, including identifying COM (serial) and LPT (parallel) ports, in block 435. The BIOS code also identifies plug-and-play devices and other similar devices and then displays a summary screen of devices identified, in block 440. The BIOS code identifies the boot location, and the corresponding boot sector, in block 445.

Configuring the ASF south bridge 212 as a slave to the ASF NIC 109, in block 415, may include setting a bit indicating the slave condition in the ASF enable register 252. Configuring the ASF south bridge 212 as the ASF master, in block 420, may include setting a bit indicating the master condition in the ASF enable register 252.

Figure 7A:
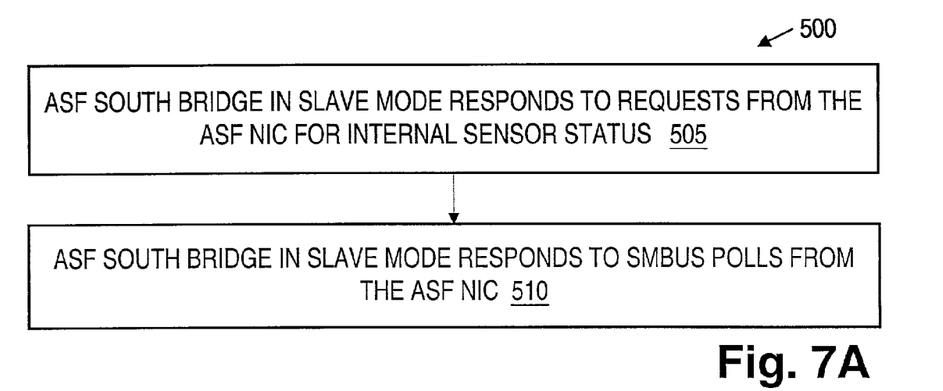
FIGS. 7A and 7B illustrate flowcharts of embodiments of method for operating a computer system including the ASF south bridge of FIG. 4, according to various aspects of the present invention.

FIG. 7A illustrates a flowchart of an embodiment of a method 500 for operating a computer system including the ASF south bridge 212 in slave mode, according to one aspect of the present invention. In slave mode, the ASF south bridge 212 responds to reads of internal sensor status by the ASF NIC 109, in block 505. The ASF south bridge 212 in slave mode responds to SMBus 215 polls originating on the ASF NIC 109, in block 510. The ASF south bridge 212 in slave mode also provides control points for the ASF NIC 109, allowing the ASF NIC 109 to reset the computer system 200 and cycle the power to the computer system 200.

Figure 7B:
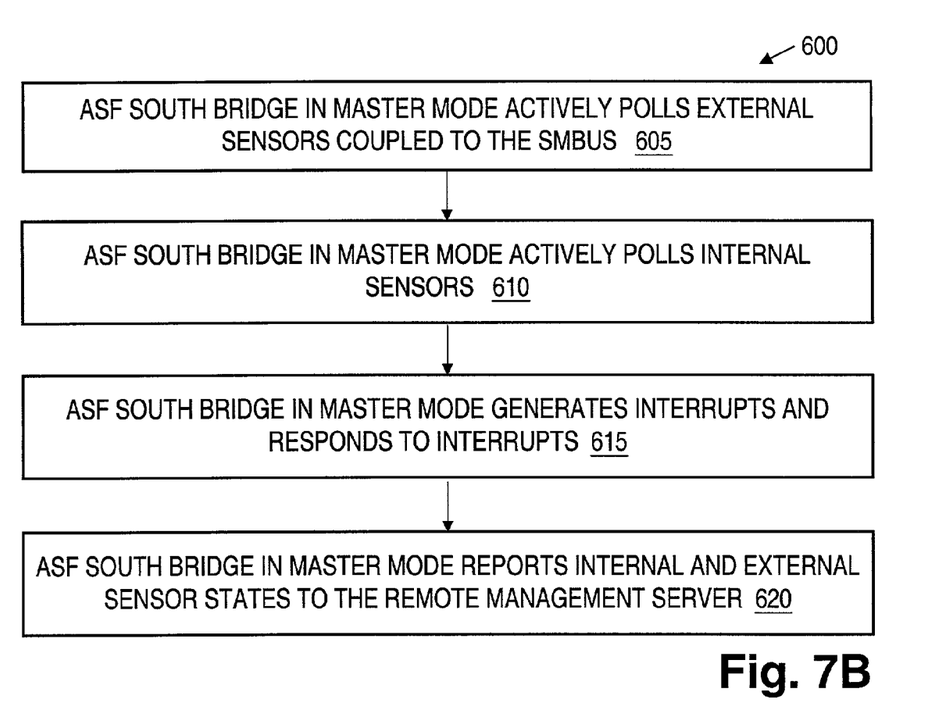

FIG. 7B illustrates a flowchart of an embodiment of a method 600 for operating a computer system including the ASF south bridge 212 in master mode, according to one aspect of the present invention. In master mode, the ASF south bridge 212 actively polls external sensors coupled to the SMBus 215 at a programmable polling rate, in block 605. The ASF south bridge 212 in master mode actively polls or otherwise monitors internal sensor states, in block 610. The ASF south bridge 212 in master mode may generate interrupts and/or respond to interrupts, in block 615. Resulting external sensor status values are combined with internally monitored sensor values and reported to the remote management server 90 via the Ethernet core 344 in the ASF south bridge 212, in block 620.

For the purposes of this disclosure, references to ROM are to be construed as also applying to flash memory and other substantially non-volatile memory types. Note that while the methods of the present invention disclosed herein have been illustrated as flowcharts, various elements of the flowcharts may be omitted or performed in different order in various embodiments. Note also that the methods of the present invention disclosed herein admit to variations in implementation.

Some aspects of the invention as disclosed above may be implemented in hardware or software. Thus, some portions of the detailed descriptions herein are consequently presented in terms of a hardware implemented process and some portions of the detailed descriptions herein are consequently presented in terms of a software-implemented process involving symbolic representations of operations on data bits within a memory of a computing system or computing device. These descriptions and representations are the means used by those in the art to convey most effectively the substance of their work to others skilled in the art using both hardware and software. The process and operation of both require physical manipulations of physical quantities. In software, usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software-implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. An integrated circuit, comprising:
    a first bus interface logic for coupling to a first external bus;
    an Alert Standard Format management engine configured to receive Alert Standard Format sensor data over the first external bus; and
    an indicator configured to indicate a master mode for the embedded Alert Standard Format management engine when an interface card is determined to be coupled to the first external bus or a slave mode for the embedded Alert Standard Format management engine when the interface card is determined to be absent from the first external bus, wherein in the master mode, the embedded Alert Standard Format management engine is further configured to actively poll for the Alert Standard Format sensor data over the first external bus.

2. The integrated circuit of claim 1, further comprising:
    a second bus interface logic for coupling to a first internal bus, wherein data from the first external bus is routable by the embedded Alert Standard Format management engine over the first internal bus.

3. The integrated circuit of claim 2, further comprising:
    an embedded Ethernet controller coupled to the first internal bus.

4. The integrated circuit of claim 3, wherein the embedded Ethernet controller is configured to route the Alert Standard Format sensor data from the embedded Alert Standard Format management engine to an external management server.

5. The integrated circuit of claim 1, wherein the indicator is stored in an enable register in the integrated circuit.

6. The integrated circuit of claim 5, further comprising:
    a power port configured to receive a reserve power signal, wherein the reserve power signal provides reserve power to the enable register.

7. The integrated circuit of claim 1, wherein the integrated circuit comprises a bridge, wherein the bridge further includes:
    a third bus interface logic for coupling to a second external bus.

8. The bridge of claim 7, wherein the bridge comprises a south bridge, wherein the first external bus is configurable as a first input/output bus.

9. The south bridge of claim 8, wherein the first input/output bus is an SMBus.

10. The integrated circuit of claim 1, wherein the embedded Alert Standard Format management engine comprises a microcontroller.

11. The integrated circuit of claim 10, wherein the microcontroller is further configured as an embedded 8051 microcontroller.

12. The integrated circuit of claim 1, wherein the embedded Alert Standard Format management engine in slave mode is configured to respond to an external Alert Standard Format master.

13. An integrated circuit, comprising:
    means for coupling to a first external bus;
    means for receiving Alert Standard Format sensor data over the first external bus;
    means for determining whether an interface card is coupled to the first external bus; and
    means for indicating a master mode for receiving Alert Standard Format sensor data when the interface card is determined to be coupled to the first external bus or a slave mode for the means for receiving Alert Standard Format sensor data when the interface card is determined to be absent from the first external bus, wherein in the master mode, the means for receiving Alert Standard Format sensor data are further configured to actively poll for the Alert Standard Format sensor data over the first external bus.

14. The integrated circuit of claim 13, further comprising:
    means for routing the Alert Standard Format sensor data from the means for receiving Alert Standard Format sensor data to an external management server.

15. The integrated circuit of claim 13, wherein the means for receiving Alert Standard Format sensor data is configured to respond to an external Alert Standard Format master while in the slave mode.

16. A client computer system, comprising:
    a first bus;
    a location for coupling to the first bus configured to receive an Alert Standard Format network interface card; and
    an integrated circuit, comprising:
        a first bus interface logic for coupling to the first bus;
        an Alert Standard Format management engine for receiving ASF sensor data configured to receive ASF sensor data over the first bus; and
        an indicator configured to indicate a master mode for the Alert Standard Format management engine when an interface card is coupled to the first external bus or a slave mode for the Alert Standard Format management engine when the interface card is absent from the first external bus, wherein in the master mode, the Alert Standard Format management engine is further configured to actively poll for the ASF sensor data over the first bus, while, the Alert Standard Format management engine is not further configured to actively poll for the ASF sensor data over the first bus in the slave mode.

17. The client computer system of claim 16, wherein the Alert Standard Format management engine comprises a microcontroller.

18. The client computer system of claim 17, wherein the microcontroller includes an embedded 8051 microcontroller.

19. The client computer system of claim 16, wherein the integrated circuit comprises a bridge, wherein the bridge further includes:
a third bus interface logic for coupling to a second external bus.

20. The client computer system of claim 19, wherein the bridge comprises a south bridge, wherein the first external bus is configurable as a first input/output bus.

21. The client computer system of claim 16, further comprising:
the Alert Standard Format network interface card installed at the location; and
wherein the indicator of the integrated circuit indicates the slave mode in response to the presence of the Alert Standard Format network interface card.

22. A method for performing ASF alerting and control in a client computer system, the method comprising:
detecting an Alert Standard Format network interface card presence in the client computer system;
operating an Alert Standard Format south bridge in a slave mode in response to detecting the Alert Standard Format network interface card presence in the client computer system positively; and
operating the Alert Standard Format south bridge in a master mode in response to detecting the Alert Standard Format network interface card presence in the client computer system negatively.

23. The method of claim 22, further comprising:
providing an indication of either the master mode or the slave mode for the Alert Standard Format south bridge in response to detecting the Alert Standard Format network interface card presence in the client computer system.

24. The method of claim 22, wherein operating the Alert Standard Format south bridge in the master mode comprises the Alert Standard Format south bridge polling Alert Standard Format sensors in the client computer system for Alert Standard Format sensor status values and responding to requests from an external management server for the Alert Standard Format sensor status values.

25. The method of claim 22, wherein operating the Alert Standard Format south bridge in the slave mode comprises responding to Alert Standard Format requests from the Alert Standard Format network interface card by the Alert Standard Format south bridge.

26. A computer readable medium encoded with instructions that, when executed by a client computer system, performs a method for performing ASF alerting and control in a client computer system, the method comprising:
detecting an Alert Standard Format network interface card presence in the client computer system;
operating an Alert Standard Format south bridge in a slave mode in response to detecting the Alert Standard Format network interface card presence in the client computer system positively; and
operating the Alert Standard Format south bridge in a master mode in response to detecting the Alert Standard Format network interface card presence in the client computer system negatively.

27. The computer readable medium as set forth in claim 26, the method further comprising:
providing an indication of either the master mode or the slave mode for the Alert Standard Format south bridge in response to detecting the Alert Standard Format network interface card presence in the client computer system.

28. The computer readable medium as set forth in claim 26, wherein operating the Alert Standard Format south bridge in the master mode comprises the Alert Standard Format south bridge polling Alert Standard Format sensors in the client computer system for Alert Standard Format sensor status values and responding to requests from an external management server for the Alert Standard Format sensor status values.

29. The computer readable medium as set forth in claim 26, wherein operating the Alert Standard Format south bridge in the slave mode comprises responding to Alert Standard Format requests from the Alert Standard Format network interface card by the Alert Standard Format south bridge.

* * * * *